United States Patent
Chandrasekaran et al.

(10) Patent No.: US 11,882,182 B2
(45) Date of Patent: Jan. 23, 2024

(54) METHOD AND A NETWORK MANAGEMENT SYSTEM FOR DETERMINING STORAGE NODE FOR A NETWORK ELEMENT

(71) Applicant: SAMSUNG ELECTRONICS CO., LTD., Suwon-si (KR)

(72) Inventors: Ganesh Chandrasekaran, Karnataka (IN); Boopathi Ramasamy, Karnataka (IN); Rajesh Challa, Karnataka (IN); Pranay Dhondi, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/880,123

(22) Filed: Aug. 3, 2022

(65) Prior Publication Data
US 2023/0043784 A1   Feb. 9, 2023

(30) Foreign Application Priority Data

Aug. 4, 2021 (IN) .............................. 202141035214
Jul. 29, 2022 (IN) .............................. 202141035214

(51) Int. Cl.
*G06F 15/16* (2006.01)
*H04L 67/1097* (2022.01)
(Continued)

(52) U.S. Cl.
CPC ...... *H04L 67/1097* (2013.01); *G06F 9/45558* (2013.01); *H04L 67/1004* (2013.01); *G06F 2009/45595* (2013.01)

(58) Field of Classification Search
CPC ............. H04L 67/1097; H04L 67/1004; G06F 9/45558
(Continued)

(56) References Cited

U.S. PATENT DOCUMENTS 7,904,592 B2 * 3/2011 Norton .................. H04L 51/063
370/312
10,152,428 B1 * 12/2018 Alshawabkeh ..... G06F 12/1009
(Continued)

FOREIGN PATENT DOCUMENTS

CN          111752678         10/2020

OTHER PUBLICATIONS

Chandrasekaran et al., "CASE: A Context-Aware Storage placement and retrieval Ecosystem", IEEE Access, Received Dec. 8, 2021, accepted Dec. 20, 2021, date of publication Dec. 30, 2021, date of current version Jan. 7, 2022, 12 pages.

*Primary Examiner* — Liang Che A Wang
(74) *Attorney, Agent, or Firm* — Nixon & Vanderhye P.C.

(57) ABSTRACT

Embodiments of present disclosure relate to a method and an electronic device for determining a storage node (SN) for a network element (NE) in a communication network. The method comprises detecting addition of a NE to a plurality of NEs, wherein each of the plurality of NEs is dynamically allocated to a virtualization unit of a plurality of virtualization units, obtaining context information associated with each of a plurality of storage nodes and the NE upon detecting the addition of the NE to the plurality of NEs, wherein the plurality of storage nodes is located in the communication network and configured to store data associated with the plurality of NEs, and determining a storage node from the plurality of storage nodes for the NE, based on the context information associated with each of the plurality of storage nodes and the NE, wherein the virtualization unit of the plurality of virtualization units allocated to each of the plurality of NEs is updated upon selection of the storage node for the NE.

18 Claims, 6 Drawing Sheets

(51) Int. Cl.
*H04L 67/1004* (2022.01)
*G06F 9/455* (2018.01)

(58) Field of Classification Search
USPC .................................... 709/219, 223, 224
See application file for complete search history.

(56) References Cited

U.S. PATENT DOCUMENTS

| | | | |
|---|---|---|---|
| 10,841,328 B2 | 11/2020 | Estes et al. | |
| 2005/0196145 A1* | 9/2005 | Nakamura | H04N 21/4367 |
| | | | 360/60 |
| 2009/0063767 A1* | 3/2009 | Graves | G06F 3/0631 |
| | | | 711/114 |
| 2015/0271183 A1* | 9/2015 | MacGregor | H04L 67/10 |
| | | | 726/4 |
| 2017/0064005 A1* | 3/2017 | Lee | H04L 67/141 |

\* cited by examiner

METHOD AND A NETWORK MANAGEMENT SYSTEM FOR DETERMINING STORAGE NODE FOR A NETWORK ELEMENT

CROSS REFERENCE TO RELATED APPLICATIONS

This application is based on and claims priority under 35 U.S.C. § 119 to Indian Provisional Patent Application Serial No. 202141035214 (PS), filed on Aug. 4, 2021, in the Indian Patent Office, and to Indian Complete Patent Application Serial No. 202141035214 (CS), filed on Jul. 29, 2022, in the Indian Patent Office, the disclosures of which are incorporated by reference herein in their entireties.

BACKGROUND

Field

The disclosure relates to communication network, for example, but not exclusively, to a method and a network management system for determining storage node for a network element.

Description of Related Art

Recently, container-based microservice architecture have gained substantial attention among several telecommunication vendors and operators. Many challenges of traditional monolithic architecture applications are tackled by microservices paradigm. The challenges of the traditional monolithic architecture may include performance issue, cost of infrastructure, lack of flexibility and so on. However, to leverage the benefits of the microservices, one needs to use technologies aligned with characteristics of the microservices for its deployment. The technologies aligned with characteristics of the microservices may include cloud native, container-runtime, and container-orchestrator.

Further, several commercial telecommunication network products including Element Management System (e-MS), radio access central unit, radio access distributed unit and core network functions are being redesigned to fit microservice paradigm. The e-MS is characterized to monitor, orchestrate, and manage key functionalities such as fault, configuration, accounting, performance and security (FCAPS) of Network Elements (NEs) such as Radio Access Network (RAN) and core deployed nationwide. In cloud environments, monitoring by centralized management system (e.g., e-MS) is critical for operational efficiency.

Microservice architecture is often conflated with Service-Oriented Architecture (SOA), as they are both interested in building reusable and scalable individual components that can be consumed by other applications. Irrespective of any chosen architecture, dynamic scaling on demand and high availability are important non-functional requirements that need to be met for carrier-grade service providers. Stateless microservice applications deployed as independent container, allow dynamically replication on demand. However, the same is not true for stateful microservices. Containers are characterized by having an ephemeral state and hence deploying a replicated set of stateful microservice applications requires coordination between replicas to keep them synchronized for retrieval and update e.g., the "state" aspect introduces more complexity to the system.

Currently, to address the above-mentioned problems, existing system utilize different frameworks such as unified storage node framework, range-based storage node framework, and centralized relational positioning storage node framework. However, the existing systems have certain drawbacks such as, the existing systems queue up excess requests from network elements for future processing, increase in operational cost, increase in overhead and so on. Thus, the existing systems are unable to overcome the problems related to the cloud-native and microservice paradigms efficiently.

The information disclosed in this background of the disclosure section is simply for enhancement of understanding of the general background of the disclosure and should not be taken as an acknowledgement or any form of suggestion that this information forms the prior art already known to a person skilled in the art.

SUMMARY

According to an example embodiment, the disclosure provides a method for determining a storage node for a Network Element (NE) by an electronic device in a communication network. The method comprises: detecting an addition of a NE to a plurality of NEs, wherein each of the plurality of NEs is dynamically allocated to a virtualization unit of a plurality of virtualization units; obtaining context information associated with each of a plurality of storage nodes and the NE upon detecting the addition of the NE to the plurality of NEs, wherein the plurality of storage nodes is located in the telecommunication network and configured to store data associated with the plurality of NEs; determining a storage node from the plurality of storage nodes for the NE, based on the context information associated with each of the plurality of storage nodes and the NE, wherein the virtualization unit of the plurality of virtualization units allocated to each of the plurality of NEs is updated upon selection of the storage node for the NE.

According to an example embodiment, the disclosure provides an electronic device for determining a storage node for a Network Element (NE) in a telecommunication network. The network management system includes: a processor and a memory communicatively coupled to the processor. The memory stores processor-executable instructions, which on execution cause the electronic device to: detect an addition of a NE to a plurality of NEs, wherein each of the plurality of NEs is dynamically allocated to a virtualization unit of a plurality of virtualization units; obtain context information associated with each of a plurality of storage nodes and the NE upon detecting the addition of the NE to the plurality of NEs, the plurality of storage nodes is located in the telecommunication network and configured to store data associated with the plurality of NEs; and determine a storage node from the plurality of storage nodes for the NE, based on the context information associated with each of the plurality of storage nodes and the NE, wherein the virtualization unit of the plurality of virtualization units allocated to each of the plurality of NEs is updated upon selection of the storage node for the NE.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Figure 1:
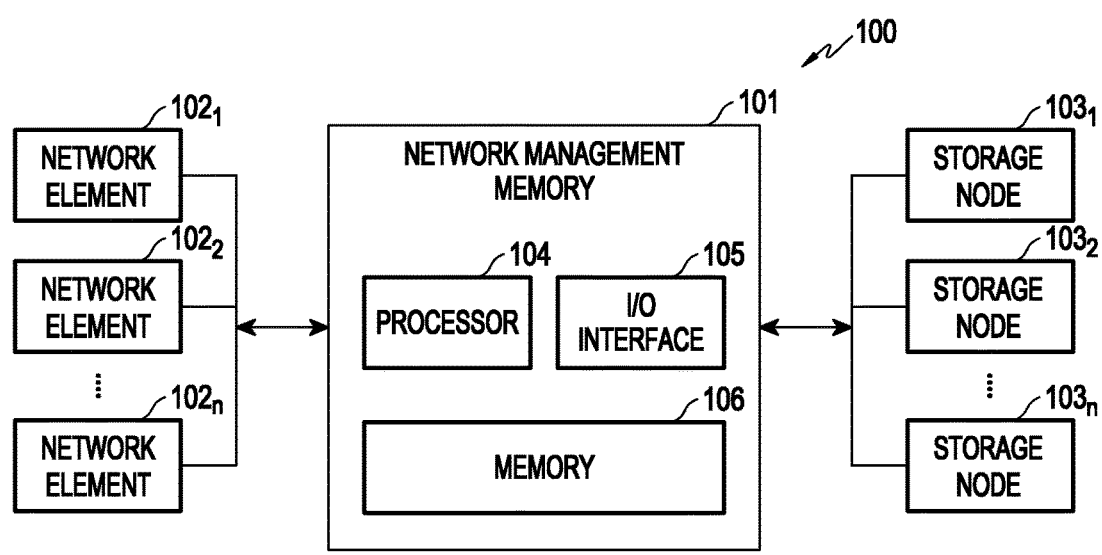
FIG. 1 is a diagram illustrating an example environment of telecommunication network for determining a storage node for a Network Element (NE), according to various embodiments.

It should be appreciated by those skilled in the art that any block diagrams herein represent conceptual views of illustrative systems embodying example principles of the present disclosure. Similarly, it will be appreciated that any flowcharts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the disclosure, the word "exemplary" is used herein to refer to "serving as an example, instance, or illustration." Any embodiment or implementation of the present disclosure described herein as "exemplary" is not necessarily to be construed as preferred or advantageous over other embodiments.

While the disclosure is susceptible to various modifications and alternative forms, specific embodiments thereof have been shown by way of example in the drawings and will be described in greater detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration various example embodiments in which the disclosure may be practiced. It is to be understood that various embodiments may be utilized and that changes may be made without departing from the scope of the present disclosure. The following description is, therefore, not to be taken in a limiting sense.

Present disclosure relates to a method and network management system for determining a storage node for a Network Element (NE) in a telecommunication network. Currently, to manage Life Cycle Management (LCM) such as upgrading, scaling, downgrading and so on, of Network Elements (NEs), Cloud Orchestrator (CO) and Element Management system (EMS) are deployed as independent monolithic solutions throughout a region. This may refer, for example, to all NE request being processed by the same storage node. Thus, resulting in increased load on the storage node and hindrance in dynamic scaling of the NEs. To address the above problem, the present disclosure determines a storage node for a NE based on context information. The present disclosure detects if a new NE is added to a plurality of NEs by monitoring the plurality of NEs. When the new NE is added, a request is load balanced among virtualization units allocated to the plurality of NEs. The present disclosure obtains context information related to multiple storage nodes located in the telecommunication network and the added NE. The present disclosure utilises the context information to determine a storage node from the multiple storage nodes for the NE. Upon determining, the present disclosure updates selection of the storage node to the virtualization unit allocated to each of the plurality of NEs. Thus, the present disclosure is able to dynamically determine a storage node for a new network element and enable scaling of the NEs in the telecommunication network. Further, the present disclosure manages a request received from one of the plurality of NEs and determines a SN associated with one of the plurality of NEs.

FIG. 1 is a diagram illustrating an example environment of a telecommunication network 100 for determining a storage node for a Network Element (NE) according to various embodiments. The telecommunication network 100 comprises a network management system 101, a NE $102_1$, $102_2$, . . . , $102_n$ (hereafter referred as plurality of NEs 102) and a Storage Node (SN) $103_1$, a storage node $103_2$, . . . , $103_n$ (hereafter referred as plurality of SNs 103). The plurality of NEs 102 may be a virtual unit, or a physical unit which associated with a telecommunication domain such as, core domain, access domain and transport domain. The plurality of NEs 102 may include, but is not limited to, Virtual Network Function (VNF), Physical Network Function (PNF), Cloud-native Network Function (CNF), and the like. The plurality of SNs 103 may be a physical server with one or more Hard-Disk Drives (HDDs), Solid-State Drives (SDDs) and so on. In an embodiment, the plurality of SNs 103 may be a virtual machine or virtual Logical Unit Number (LUN) with access to one or more HDDs/SSDs. The plurality of SNs 103 is located in the telecommunication network 100 for storing data associated with the plurality of NEs 102. The network management system 101 communicates with the plurality of NEs 102 and the plurality of SNs 103 for determining a storage node when a new NE is added in the telecommunication network 100. Similarly, the network management system 101 communicates with the plurality of NEs 102 and the plurality of SNs 103 when one NE of the plurality of NEs 102 is deleted from the telecommunication network 100. The network management system 101 may be implemented as an electronic device including, but is not limited to, a Personal Computer (PC), a laptop computer, a desktop computer, a server, a network server, a cloud-based server, and the like. Further, the network management system 101 may include a processor (e.g., including processing circuitry) 104, I/O interface (e.g., including interface circuitry) 105, and a memory 106. In various embodiments, the memory 106 may be communicatively coupled to the processor 104. The memory 106 stores instructions, executable by the processor 104, which, on execution, may cause the network management system 101 to determine a storage node for a NE in the telecommunication network 100, as disclosed in the present disclosure.

In an embodiment, the network management system 101 may communicate with the plurality of NEs 102 and the plurality of SNs 103 via a communication network (not shown explicitly in FIG. 1). In an embodiment, the communication network may include, without limitation, a direct interconnection, Local Area Network (LAN), Wide Area Network (WAN), Controller Area Network (CAN), wireless network (e.g., using Wireless Application Protocol), the Internet, and the like.

In a network environment, the network management system 101 monitors the plurality of NEs 102. Based on the monitoring, the network management system 101 may detect at least one of an addition of a NE to the plurality of NEs 102 and deletion of at least one of NE of the plurality of NEs 102 in the telecommunication network 100. The NE may be added to the telecommunication network 100 based on one of, user requirement, operator requirement, interference management, network conditions, and the like. In an embodiment, addition of the NE is performed by an orchestrator and a notification related to the addition of the NE is provided to the network management system 101. The notification may be provided via known interfaces such as, ETSI GS NFV-SOL 002 Ve-VNFM-EM interface. In an embodiment, request related to addition of the NE is load balanced to one of a virtualization unit of a plurality of virtualization units of the plurality of NEs 102. Each of the plurality of NEs 102 is dynamically allocated to a virtualization unit of the plurality of virtualization units. The virtualization unit of the plurality of virtualization units may also be referred as container replica. The virtualization unit is associated with the network management system 101. In an embodiment, the virtualization unit may provide a way to virtualize an operating system so that multiple workloads can run on a single operating system. The virtualization unit may be present in a private data centre, a public cloud and so on. When the NE is added, the network management system 101 may obtain context information associated with each of the plurality of SNs 103 and the NE. The context information of the plurality of SNs 103 may include, but is not limited to, information related to traffic load, type of storage node, compute load, amount of data, cost estimate, Fault Configuration Accounting Performance Security (FCAPS), geographical location and so on. The context information of the NE may include, but is not limited to, geographic location of the NE, type of NE, type of request of the NE, coverage of the NE, capacity of the NE, number of users associated with the NE and so on. Further, the network management system 101 determines a storage node from the plurality of SNs 103 for the NE based on the context information of the plurality of SNs 103 and the NE. Upon selection of the storage node, the virtualization unit of the plurality of virtualization units allocated to each of the plurality of NEs 102 is updated. The virtualization unit of the plurality of virtualization units comprises a content management table which is updated based on a notification received from the virtualization unit corresponding to the NE. The notification is an Updated Context Publication (UCP) message. The notification comprises an address of a storage node determined for the NE and a hash value of the storage node. In an embodiment, the notification may contain three fields namely, 'message type', 'SN address', and 'bloom filter'. The 'SN address' indicates a unique reference to a specific data node e.g., the selected SN. The 'message type' indicates that the message/notification is a 'UCP'. The third field in the notification is a bloom filter, which is a probabilistic data structure that allows for a set of elements to be represented by a single space-efficient bit string. A person skilled in the art may appreciate that any hashing function may be used to obtain a hash value of the storage node and is not limited to the bloom filter. The content management table comprises an address of each of the plurality of SNs 103 and a hash value of identifiers associated with the plurality of NEs 102. Further, when the network management system 101 detects the deletion of one of the NE of the plurality of NEs 102, the network management system 101 may update the virtualization unit of the plurality of virtualization units allocated to each of the plurality of NEs 102.

In an embodiment, the network management system 101 may receive a request from one of the NE of the plurality of NEs 102 for performing one or more operations. The one or more operations may include, but is not limited to, create, read, update, delete (CRUD), and the like. The network management system 101 may transmits a response for the request to one of the NE of the plurality of NEs 102 by processing the request using respective content management table. For example, when a request originates from a NE of the plurality of NEs 102, the request is load balanced to one of the virtualization units of the plurality of virtualization units. Thereafter, the network management system 101 may find a respective SN address based on the identifier (ID) of the NE from whom the request is originated. Then, the network management system 101 may process the request and transmits a response for the request by performing the CRUD operations on information stored in the SN.

Figure 2:
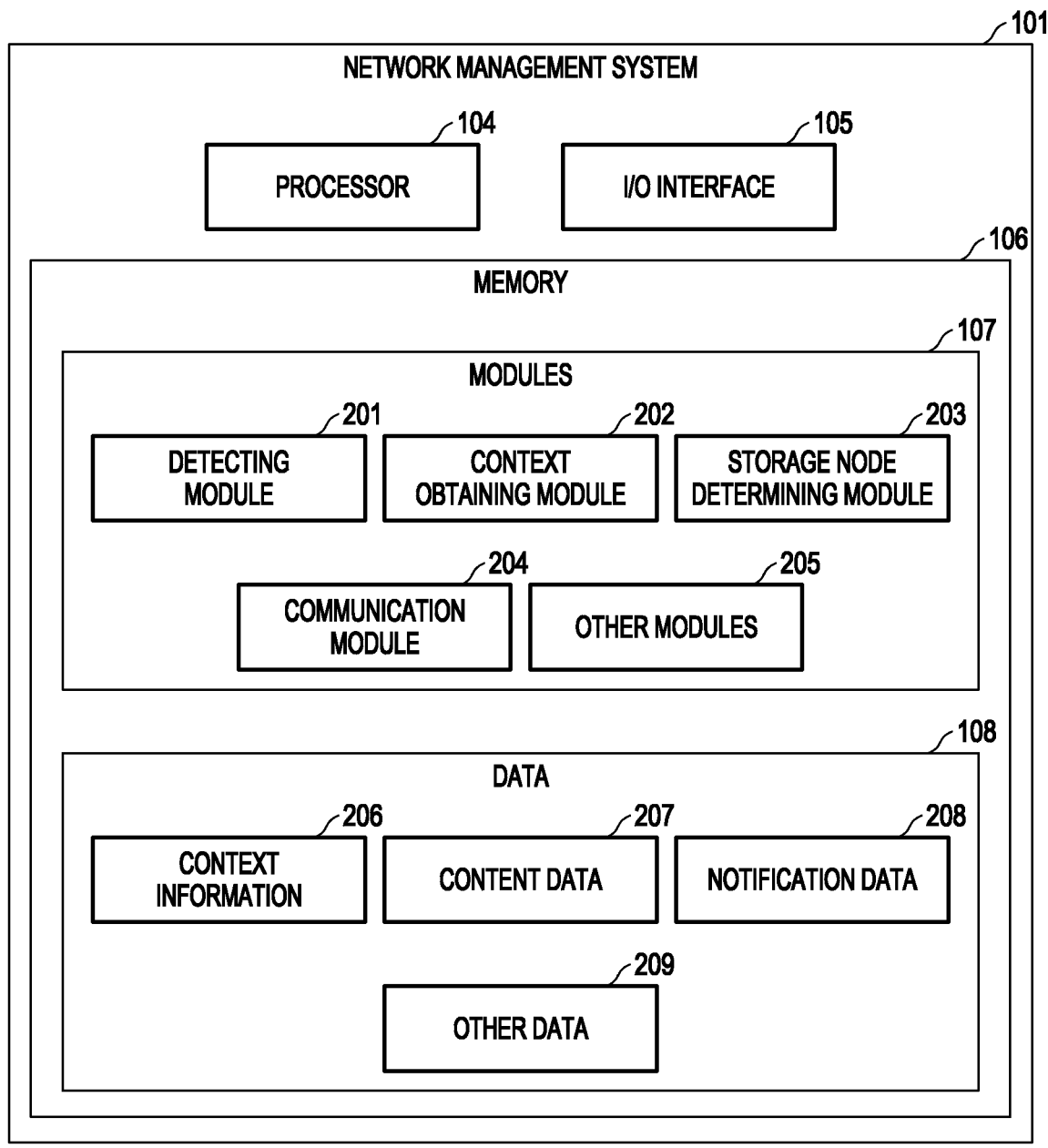
FIG. 2 is a block diagram illustrating an example configuration of a network management system for determining a storage node for a Network Element (NE) in a telecommunication network, according to various embodiments.

FIG. 2 is block diagram illustrating an example configuration of a network management system for determining a storage node for a Network Element (NE) in a telecommunication network, according to various embodiments.

Data 108 and one or more modules 107 in the memory 106 of the network management system 101 is described in greater detail below.

In an embodiment, the one or more modules 107 may include, but are not limited to, a detecting module 201, a context obtaining module 202, a storage node determining module 203, a communication module 204, and one or more other modules 205, associated with the network management system 101. Each of the modules may include various executable program instructions for execution by the processor 104.

In an embodiment, the data 108 in the memory 106 may include context information 206, content data 207, notification data 208, and other data 209 associated with the network management system 101.

In an embodiment, the data 108 in the memory 106 may be processed by the one or more modules 107 of the network management system 101. The one or more modules 107 may be configured to perform the steps of the present disclosure using the data 108, for determining a SN for a NE in the telecommunication network 100. In an embodiment, each of the one or more modules 107 may be a hardware unit which may be outside the memory 106 and coupled with the network management system 101. In an embodiment, the one or more modules 107 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

The one or more modules 107 along with the data 108, may be implemented in any network management system 101, for determining the SN for the NE in the telecommunication network 100.

The context information 206 may include details related to the plurality of SNs 103 and the NE added to the telecommunication network 100. The context information 206 related to the plurality of SNs 103 comprises information related to traffic load, type of storage node, compute load, amount of data, cost estimate, Fault Configuration Accounting Performance Security (FCAPS) and geographical location. The context information 206 related to the NE comprises geographic location of the NE, type of NE, type of request of the NE, coverage of the NE, capacity of the NE, and number of users associated with the NE.

The content data 207 may include information related to address of each of the plurality of SNs 103 and a hash value of identifiers associated with the plurality of NEs 102.

The notification data 208 may include an address of a storage node determined for the NE, and a hash value of the storage node.

The other data 209 may store data, including temporary data and temporary files, generated by modules for performing the various functions of the network management system 101.

The detecting module 201 may detect an addition of a NE to the plurality of NEs 102 by monitoring the plurality of NEs 102 in the telecommunication network 100. The plurality of NEs 102 may be in the form of the VNF, the CNF, and the PNF which are distributed among both access and core domain of the telecommunication network 100. The addition of the NE may be performed based on various reasons such as, provisioning new service, scaling domain specific VNF elements based on traffic load, network slice commissioning, interference optimization, improve coverage area, network upgrades and so on. In an embodiment, when the NE is added to the plurality of NEs 102, the addition of the NE is notified in the form of an event or alarm, to a virtualization unit of the plurality of virtualization units allocated to the plurality of NEs 102. Upon detection, a request related to the addition of the NE is load balanced to the virtualization unit of the plurality of virtualization units. In an embodiment, the request may be load balanced by one or more methods. The one or more method may include, but is not limited to, round robin, random, closest first, weighted round robin, and the like. Further, the detecting module 201 may be configured to detect a deletion of one of NE from the plurality of NEs 102 by monitoring the plurality of NEs 102 in the telecommunication network 100. The deletion of one of the NE may be performed based on various factors such as, de-provisioning of existing service, network slice decommissioning, physical failures and so on. Further, upon deletion of one of the NE from the plurality of NEs 102, the detecting module 201 updates the virtualization unit of the plurality of virtualization units allocated to each of the plurality of NEs 102 based on the notification. That is, the content management table of respective virtualization unit is updated based on the notification.

When the NE is added, the context obtaining module 202 may obtain the context information associated with the plurality of SNs 103 and the NE. In an embodiment, the context obtaining module 202 may obtain the context information associated with the plurality of SNs 103 from corresponding plurality of SNs 103. In an embodiment, the context obtaining module 202 may obtain context information associated with the NE from the NE. In an embodiment, the context obtaining module 202 may obtain the context information associated with the NE from an operator.

The storage node determining module 203 is configured to receive the context information from the context obtaining module 202. Based on the context information, the storage node determining module 203 may determine a SN for the NE from the plurality of SNs 103. In an embodiment, the storage node determining module 203 also considers various information such as, location of the NE, user destiny, capacity of the NE and so on to determine the SN for the NE. For example, the storage node determining module 203 assigns an SN to the NE with decreased data access latency so as to optimally distribute traffic load across the telecommunication network 100. The storage node determining module 203 may consider the context information of each of the plurality of SNs 103 and the NE for determining the SN. For example, the storage node determining module 203 identifies which SN is appropriate for the NE based the context information. For example, if a SN is located near to the NE, the storage node determining module 203 may select that SN for the NE. Further, the storage node determining module 203 may communicate with the virtualization unit of the plurality of virtualization units allocated to each of the plurality of NEs 102 for updating their respective content management table. The content management table is updated based on a notification/UCP message received from the storage node determining module 203. The storage node determining module 203 receives the notification/UCP message from the virtualization unit corresponding to the NE. In an embodiment, when the virtualization unit of the plurality of virtualization units allocated to each of the plurality of NEs 102 receives the notification from the storage node determining module 203, the virtualization unit of the plurality of virtualization units confirms receipt of the notification by sending an acknowledgment to the storage node determining module 203. Upon sending the acknowledgement, the virtualization unit updates its respective content management table. For example, when the notification is received, the virtualization unit may first checks if its respective content management table includes entry of the SN address selected for the NE. If the entry of the SN address is found, then hash value of identifiers associated with the plurality of NEs 102 is updated. However, if the entry of the SN address is not found, then a new record is created in the content management table by copying the SN address and the hash value of the SN.

Figure 3A:
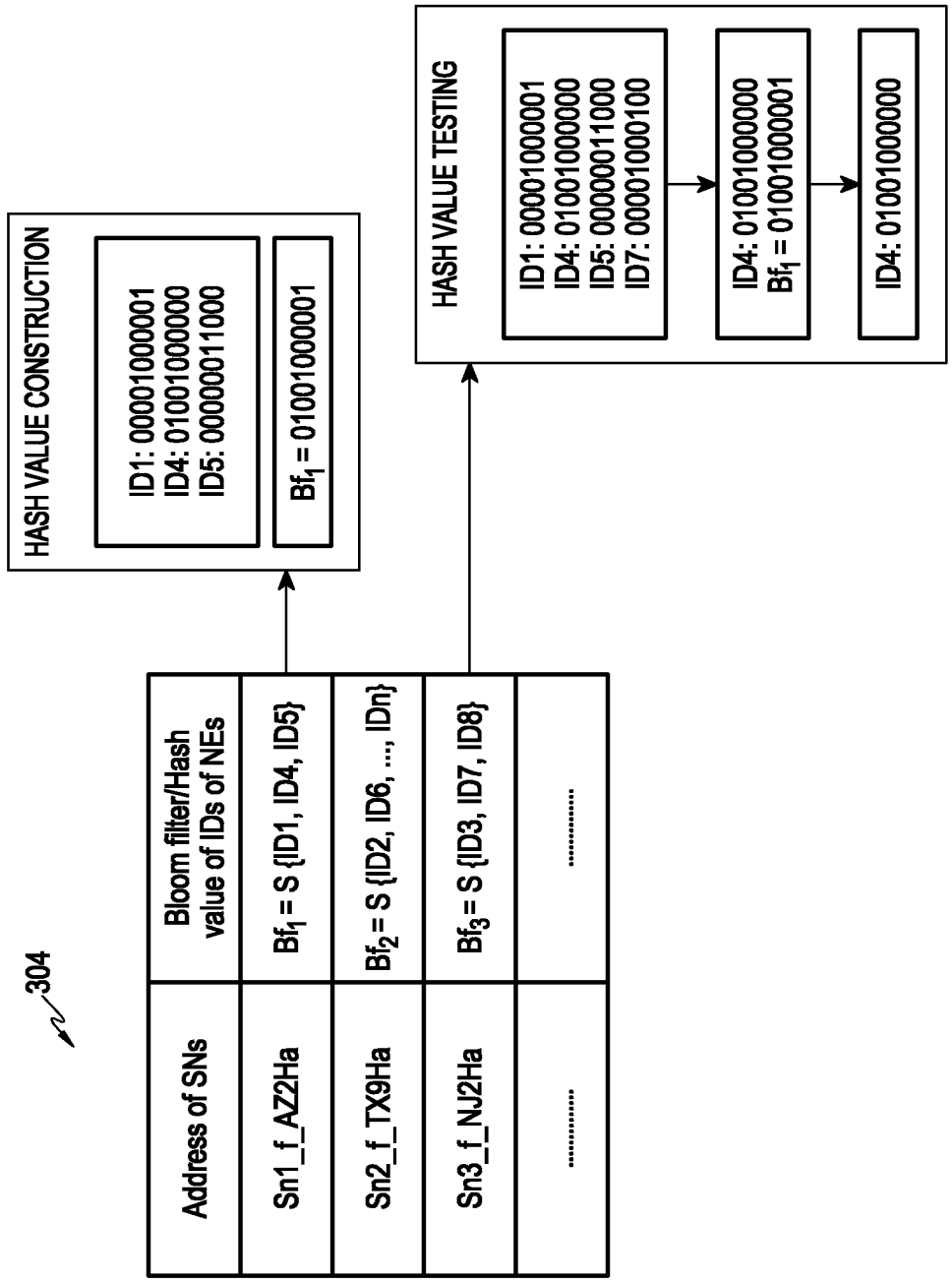
FIG. 3A is a diagram illustrating an example scenario for updating a content management table, according to various embodiments.

For example, consider FIG. 3A which illustrates an example content management table 304 of a virtualization unit. When the NE is added to the plurality of NEs 102, the content management table 304 is updated based on the notification. The content management table 304 shows two columns, where a first column comprises an address of each of the plurality of SNs 103 and second column comprises hash value of the identifiers associated with the plurality of NEs 102. In an embodiment, each of the plurality of NEs 102 are associated with a unique identifier (ID). When the NE is added, the hash value/bloom filter (bf) is constructed by performing a bitwise OR operation on the ID's of the plurality of NEs 102. In this scenario, consider that Sn1 is selected for the NE which is added. The hash vale of the content management table 304 is updated by performing bitwise OR operation on the ID1, ID4 and ID5. In FIG. 3a, value of ID1 is shown as "00001000001", value of ID4 is shown as "01001000000" and value of ID5 is shown as "00000011000". The bitwise OR operation is performed on these values of ID1, ID4 and ID5 to obtain a new hash value for the Sn1 e.g., Bf1="01001000001".

In an embodiment, during content retrieval from the plurality of SNs 103, the communication module 204 may receive a request from one of the NE of the plurality of NEs 102 for performing one or more operations. The one or more operations may include, create, read, update, delete, and the like. For example, consider that one of the NE may wish to update its information in its corresponding SN. Upon receiving the request, the communication module 204 may transmit a response for the request to one of the NE of the plurality of NEs 102 by processing the request using respective content management table. For example, consider that a NE having a unique ID e.g., ID4 sends a request for updating its information in its corresponding SN. By referring the content management table 304 of FIG. 3a, Sn1 is assigned for ID4. Thus, the request from the ID4 is load balanced to a virtualization unit. In an embodiment, the communication module 204 may perform an element membership testing for ID4 with all entries of its content management table 304 to identify corresponding SN address. This is achieved by performing a bitwise AND operation with Bf1 (hash value/bloom filter) as shown in FIG. 3A. In this scenario, when the bitwise AND operation is performed with Bf1, result may be positive indicating that the ID4 is a member of the Bf1. Thus, the communication module 204 may update the information of the ID4 in the Sn1. However, consider that NE ID7 is to be tested for a membership in Bf1. In such case, the result may be negative indicating that the ID7 is not a member of the Bf1. In such a scenario, the communication module 204 may consider other entries of the content management table 304 and perform the element membership testing until the result is positive.

The one or more modules 107 may also include other modules 205 such as, an updating module, and a hash value construction module to perform various miscellaneous functionalities of the network management system 101. The updating module may update the content management table based on the notification. The hash value construction module may construct hash value for the NE. It will be appreciated that such modules may be represented as a single module or a combination of different modules.

Figure 3B:
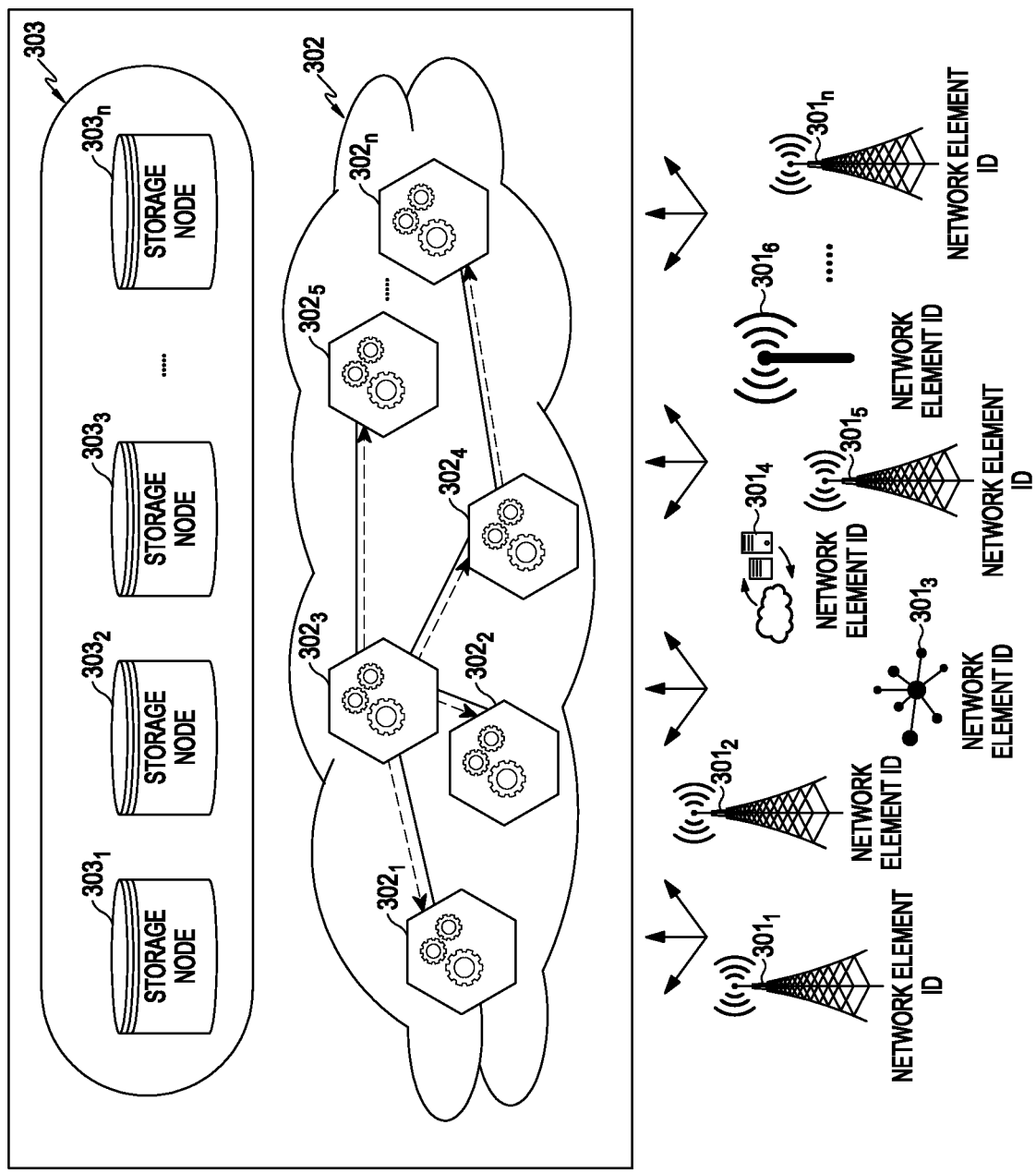
FIG. 3B is a diagram illustrating an example configuration for determining a storage node for a Network Element (NE) in a telecommunication network, according to various embodiments.

FIG. 3B is a diagram illustrating examples of determining a storage node for a Network Element (NE) in a telecommunication network, according to various embodiments. FIG. 3B shows a plurality of NEs ($301_1$, $301_2$, $301_3$, $301_4$, $301_5$, $301_6$, . . . and $301_n$) (hereafter referred as plurality of NEs 301), a plurality of virtualization units ($302_1$, $302_2$, $302_3$, $302_4$, $302_5$, . . . and $302_n$) (hereafter referred as plurality of virtualization units 302) dynamically allocated to each of the plurality of NEs 301, and a storage pool 303. The storage pool 303 comprises a plurality of SNs ($303_1$, $303_2$, $303_3$, . . . and $303_n$) (hereafter referred as plurality of SNs 303). For example, based on user requirements, operator may add a new NE e.g., $301_7$, to the plurality of NEs 301. The addition of the new NE $301_7$ is detected by the network management system 101 by monitoring the plurality of NEs 301. Upon detecting, request related to addition of NE $301_7$ is load balanced among the plurality of virtualization units 302. The network management system 101 obtains content information of the plurality of SNs 303 and the NE $301_7$. Further, the network management system 101 determines a SN from the plurality of SNs 303 for the NE $301_7$ based on the content information. For example, the network management system 101 may select SN $303_3$ for the NE $301_7$ based on the geographical location. The network management system 101 sends a notification upon selection of the SN. Further, the network management system 101 updates the plurality of virtualization units 302 allocated to each of the plurality of NEs 301 based on the notification. Similarly, when a NE from the plurality of NEs 301 is deleted, the network management system 101 detects deletion of the NE and updates the plurality of virtualization units 302 based on the notification. Further, when a new SN is added, it is added to the storage pool 303 for future NE.

Figure 4:
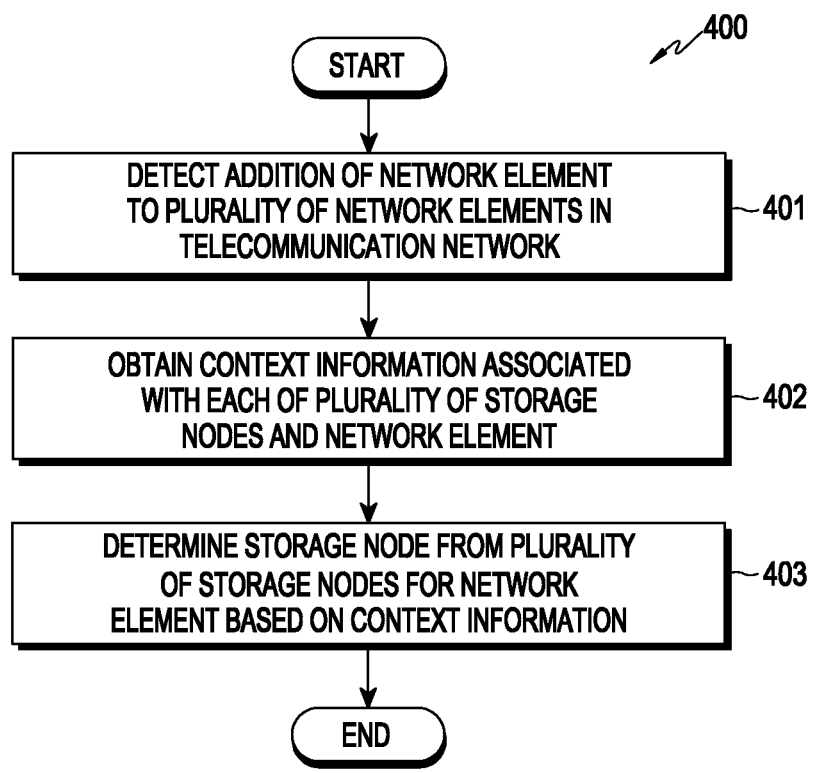
FIG. 4 is a flowchart illustrating an example method for determining a storage node for a Network Element (NE) in a telecommunication network, according to various embodiments.

FIG. 4 is a flowchart illustrating an example method for determining a storage node for a Network Element (NE) in a telecommunication network, according to various embodiments.

As illustrated in FIG. 4, the method 400 may include one or more blocks for executing processes in the network management system 101. The method 400 may be described in the general context of computer executable instructions. Generally, computer executable instructions can include routines, programs, objects, components, data structures, procedures, modules, and functions, which perform particular functions or implement particular abstract data types.

The order in which the method 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 401, detecting, by the detecting module 201, an addition of a NE to the plurality of NEs 102. The addition of the NE is detected by monitoring the plurality of NEs 102. The NE is added based on one of user requirement, operator requirement, interference management, and network conditions. Each of the plurality of NEs 102 is dynamically allocated to a virtualization unit of a plurality of virtualization units. The virtualization unit of the plurality of virtualization units is allocated to each of the plurality of NEs 102 based on a load corresponding to the plurality of virtualization units and load balancing policies. Further, the detecting module 201 may detect a deletion of one of the NE of the plurality of NEs 102 by monitoring the plurality of NEs 102 in the telecommunication network 100. The detecting module 201 updates the virtualization unit of the plurality of virtualization units allocated to each of the plurality of NEs 102 upon the deletion of one of the NE of the plurality of NEs 102.

At 402, obtaining, by the context obtaining module 202, the context information associated with each of a plurality of SNs 103 and the NE. The plurality of SNs 103 is located in the telecommunication network 100 for storing data associated with the plurality of NEs 102. The context information of the plurality of SNs 103 comprises information related to traffic load, type of storage node, compute load, amount of data, cost estimate, FCAPS and geographical location. The context information of the NE network element comprises geographic location of the NE, type of NE, type of request of the NE, coverage of the NE, capacity of the NE, and number of users associated with the NE.

At 403, determining, by the storage node determining module 203, a storage node from the plurality of SNs 103 for the NE based on the context information of the plurality of SNs 103 and the NE. The virtualization unit of the plurality of virtualization units allocated to each of the plurality of NEs 102 is updated upon selection of the storage node for the NE. For example, the virtualization unit of the plurality of virtualization units allocated to each of the plurality of NEs 102 comprises a content management table which is updated based on a notification received from the virtualization unit corresponding to the NE. The notification comprises an address of a storage node determined for the NE, and a hash value of the storage node. The content management table comprises an address of each of the plurality of SNs 103 and a hash value of identifiers associated with the plurality of NEs 102.

Computing System

Figure 5:
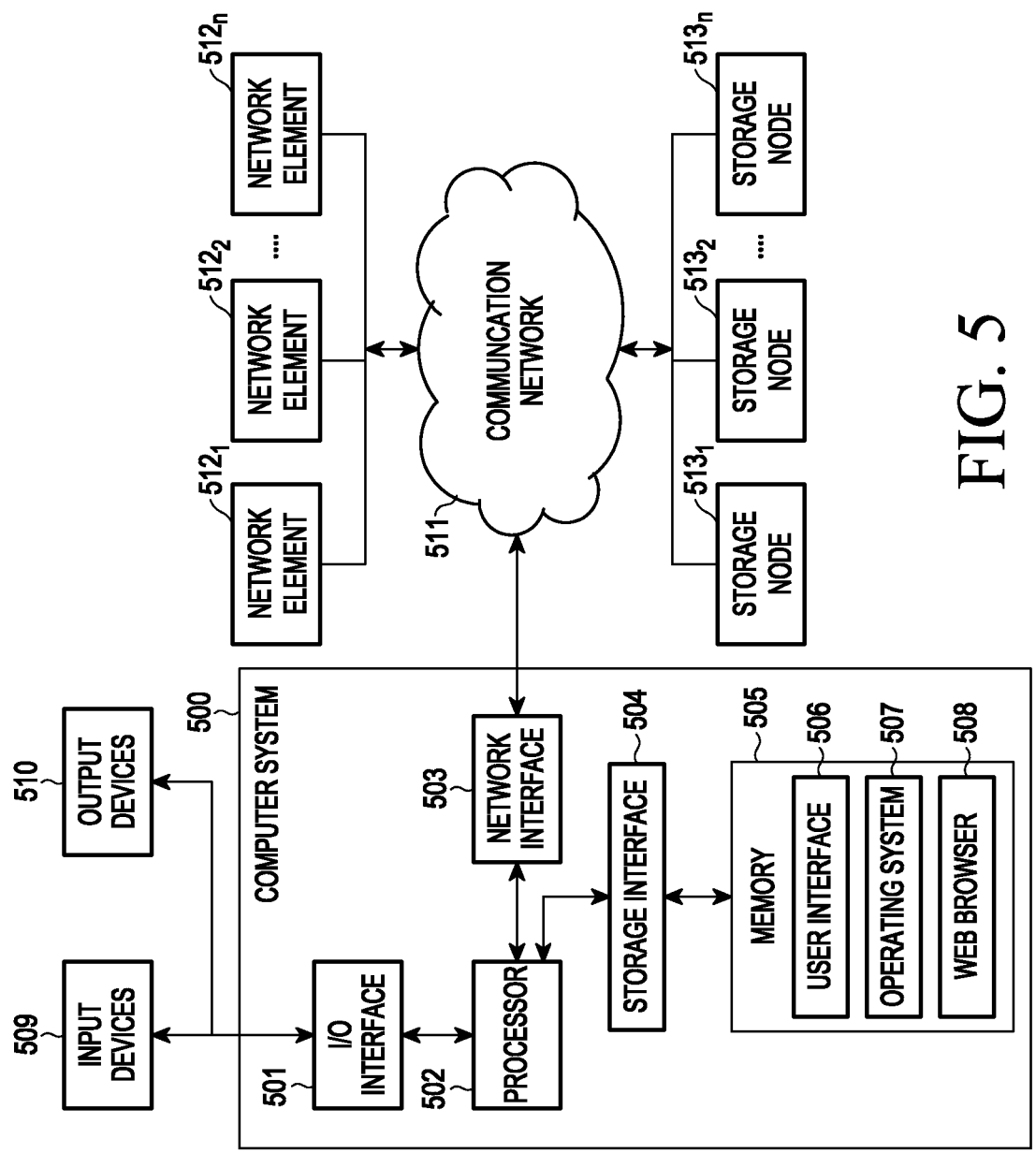
FIG. 5 is a block diagram illustrating an example configuration of a computer system for implementing various embodiments of the present disclosure.

FIG. 5 is a block diagram illustrating an example configuration of a computer system 500 for implementing various embodiments of the present disclosure. In an embodiment, the computer system 500 is used to implement the network management system 101. The computer system 500 may include a central processing unit ("CPU" or "processor") 502. The processor (e.g., including processing circuitry) 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In various embodiments, the computer system 500 may include the network management system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with plurality of NEs 512 and plurality of SNs 513 for determining SN for NE in the telecommunication network. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In various embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, a web browser 508 etc. In various embodiments, computer system 500 may store user/application data, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and may not include carrier waves and transient signals, e.g., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method for determining a storage node for a NE in telecommunication network based on context information. Thus, the SN can be dynamically determined for the NE added to the plurality of NEs.

An embodiment of the present disclosure provisions low overhead, dynamic on-demand scaling, new service provisioning, addition of new NE, addition of SN and so on.

An embodiment of the present disclosure provisions maximum utilisation of SNs for the plurality of NEs.

An embodiment of the present disclosure provision optimal distribution of traffic load among the SNs.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the disclosure, and that the article of manufacture may include suitable information bearing medium known in the art.

The terms "an embodiment", "embodiment", "embodiments", "the embodiment", "the embodiments", "one or more embodiments", "some embodiments", and "one embodiment" may refer, for example, to "one or more (but not all) embodiments" unless expressly specified otherwise.

The terms "including", "comprising", "having" and variations thereof may refer, for example, to "including but not limited to", unless expressly specified otherwise.

The enumerated listing of items does not imply that any or all of the items are mutually exclusive, unless expressly specified otherwise.

The terms "a", "an" and "the" may refer, for example, to "one or more", unless expressly specified otherwise.

A description of an embodiment with several components in communication with each other does not imply that all such components are required. A variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, various embodiments of the disclosure need not include the device itself.

The illustrated operations of FIG. 4 shows certain events occurring in a certain order. In various embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of determining a storage node for a Network Element (NE) by an electronic device in a communication network, the method comprising:
   detecting addition of a NE to a plurality of NEs, wherein each of the plurality of NEs is dynamically allocated to a virtualization unit of a plurality of virtualization units;
   obtaining information associated with a plurality of storage nodes and information associated with the NE, upon detecting the addition of the NE to the plurality of NEs, wherein the plurality of storage nodes is located in the communication network and configured to store data associated with the plurality of NEs; and
   determining a storage node from the plurality of storage nodes for the NE, based on the information associated with the plurality of storage nodes and the information associated with the NE,
   wherein the virtualization unit of the plurality of virtualization units allocated to each of the plurality of NEs is updated upon selection of the storage node for the NE, and
   wherein the virtualization unit allocated to each of the plurality of NEs comprises a content management table updated based on the virtualization unit corresponding to the NE receiving a notification.

2. The method of claim 1, wherein the NE is added based on at least one of user requirement, operator requirement, interference management, and network conditions.

3. The method of claim 1, wherein the virtualization unit is allocated to each of the plurality of NEs based on a load corresponding to the plurality of NEs.

4. The method of claim 1, wherein the notification comprises an address of a storage node determined for the NE, and a hash value of the storage node.

5. The method of claim 1, wherein the content management table comprises an address of each of the plurality of storage nodes and a hash value of identifiers associated with the plurality of NEs.

6. The method of claim 1, further comprising: detecting a deletion of one of the plurality of NEs by monitoring the plurality of NEs in the communication network; and updating the virtualization unit allocated to each of the plurality of NEs upon the deletion of one of the plurality of NEs.

7. The method of claim 1, wherein the information associated with the plurality of storage nodes comprises information related to at least one of traffic load, type of storage node, compute load, amount of data, cost estimate, Fault Configuration Accounting Performance Security (FCAPS) and geographical location.

8. The method of claim 1, wherein the information associated with the NE further comprises information related to at least one of a geographic location of the NE, type of NE, a type of a request of the NE, a coverage of the NE, a capacity of the NE, and a number of users associated with the NE.

9. The method of claim 1, further comprising:
receiving a request from one of the plurality of NEs for performing one or more operations; and
transmitting a response for the request to one of the plurality of NEs by processing the request using respective content management table.

10. An electronic device for determining a storage node for a Network Element (NE) in a communication network, comprising:
a processor; and
a memory communicatively coupled to the processor, wherein the memory stores processor-executable instructions, which, on execution, cause the electronic device to:
detect an addition of a NE to a plurality of NEs, wherein each of the plurality of NEs is dynamically allocated to a virtualization unit of a plurality of virtualization units;
obtain information associated with a plurality of storage nodes and information associated with the NE, upon detecting the addition of the NE to the plurality of NEs, wherein the plurality of storage nodes is located in the communication network and configured to store data associated with the plurality of NEs; and
determine a storage node from the plurality of storage nodes for the NE, based on the information associated with the plurality of storage nodes and the information associated with the NE,
wherein the virtualization unit of the plurality of virtualization units allocated to each of the plurality of NEs is updated upon selection of the storage node for the NE, and
the virtualization unit allocated to each of the plurality of NEs comprises a content management table updated based on the virtualization unit corresponding to the NE receiving a notification.

11. The electronic device of claim 10, wherein the NE is added based on one of user requirement, operator requirement, interference management, and network conditions.

12. The electronic device of claim 10, wherein the virtualization unit is allocated to each of the plurality of NEs based on a load corresponding to the plurality of NEs.

13. The electronic device of claim 10, wherein the notification comprises an address of a storage node determined for the NE, and a hash value of the storage node.

14. The electronic device of claim 10, wherein the content management table comprises an address of each of the plurality of storage nodes and a hash value of identifiers associated with the plurality of NEs.

15. The electronic device of claim 10, wherein the processor is configured to: detect a deletion of one of the plurality of NEs by monitoring the plurality of NEs in the communication network; and update the virtualization unit allocated to each of the plurality of NEs upon the deletion of one of the plurality of NEs.

16. The electronic device of claim 10, wherein the information associated with the plurality of storage nodes comprises information related to at least one of traffic load, type of storage node, compute load, amount of data, cost estimate, Fault Configuration Accounting Performance Security (FCAPS) and geographical location.

17. The electronic device of claim 10, wherein the information associated with the NE further comprises information related to at least one of a geographic location of the NE, a type of the NE, a type of a request of the NE, a coverage of the NE, a capacity of the NE, and a number of users associated with the NE.

18. The electronic device of claim 10, wherein the processor is configured to: receive a request from one of the plurality of NEs for performing one or more operations; and transmit a response for the request to one of the plurality of NEs by processing the request using respective content management table.

* * * * *